(12) United States Patent
Nishino

(10) Patent No.: US 7,173,634 B2
(45) Date of Patent: Feb. 6, 2007

(54) INFORMATION DISPLAYING SYSTEM

(75) Inventor: Masaaki Nishino, Shizuoka (JP)

(73) Assignee: Nec Corporation, Tokyo (JP)

( * ) Notice: Subject to any disclaimer, the term of this patent is extended or adjusted under 35 U.S.C. 154(b) by 12 days.

(21) Appl. No.: 09/853,634

(22) Filed: May 14, 2001

(65) Prior Publication Data

US 2001/0043228 A1  Nov. 22, 2001

(30) Foreign Application Priority Data

May 16, 2000 (JP) .............................. 2000-143933

(51) Int. Cl.
*G09G 5/14* (2006.01)
(52) U.S. Cl. .................................................. 345/660
(58) Field of Classification Search ................ 345/660, 345/501, 699, 213, 781, 790, 619, 629; 348/441
See application file for complete search history.

(56) References Cited

U.S. PATENT DOCUMENTS

| | | | | |
|---|---|---|---|---|
| 5,065,252 A * | 11/1991 | Yoshio et al. | ............... | 386/102 |
| 5,426,731 A * | 6/1995 | Masukane et al. | ........... | 345/501 |
| 5,758,177 A * | 5/1998 | Gulick et al. | ................... | 712/1 |
| 6,002,446 A * | 12/1999 | Eglit | ............................ | 348/581 |
| 6,014,125 A * | 1/2000 | Herbert | ....................... | 345/660 |
| 6,067,098 A * | 5/2000 | Dye | .............................. | 345/531 |
| 6,115,092 A * | 9/2000 | Greene et al. | ................. | 349/74 |
| 6,175,387 B1 * | 1/2001 | Han | ............................. | 348/565 |
| 6,204,932 B1 * | 3/2001 | Haneda et al. | ............... | 358/1.9 |
| 6,342,892 B1 * | 1/2002 | Van Hook et al. | ........... | 345/503 |
| 6,356,313 B1 * | 3/2002 | Champion et al. | ........... | 348/558 |
| 6,441,857 B1 * | 8/2002 | Wicker et al. | ............... | 348/441 |
| 6,469,703 B1 * | 10/2002 | Aleksic et al. | ............... | 345/542 |
| 6,493,008 B1 * | 12/2002 | Yui | .............................. | 345/840 |
| 6,526,098 B1 * | 2/2003 | Kato et al. | ............. | 375/240.24 |
| 6,774,912 B1 * | 8/2004 | Ahmed et al. | ............... | 345/629 |

FOREIGN PATENT DOCUMENTS

| | | |
|---|---|---|
| JP | 8-320878 A | 12/1996 |
| JP | 9-307812 A | 11/1997 |
| JP | 11-265189 A | 9/1999 |
| JP | 11-289472 A | 10/1999 |

* cited by examiner

*Primary Examiner*—Kee M. Tung
*Assistant Examiner*—J. Amini
(74) *Attorney, Agent, or Firm*—Sughrue Mion, PLLC

(57) ABSTRACT

An information displaying system, in which digital information data such as news and a commercial message are displayed with screen data on a display without decreasing the amount of the screen data that are displayed in a working region of the display, is provided. A screen mixing unit mixes digital information data such as news and a commercial message at digital information data adding regions at outside a working region where screen data from a personal computer are displayed on a display with the screen data, without decreasing the screen data in the working region. And the mixed data are converted to data having a frequency being capable of displaying on the display. With this, the digital information data can be displayed with the screen data on the display without decreasing the amount of the screen data that are displayed on the working region on the display. Further, the screen mixing that is conventionally executed in the personal computer is executed in the screen mixing unit in the information displaying system, therefore the load for the personal computer can be reduced.

8 Claims, 4 Drawing Sheets

INFORMATION DISPLAYING SYSTEM

BACKGROUND OF THE INVENTION

The present invention relates to an information displaying system, in particular, in which digital information data such as news and a commercial message inputted from such as a personal computer (PC) is displayed with screen data on a display.

Description of the Related Art

At a conventional information displaying system, which displays digital information data such as news and a commercial message inputted from such as a PC with screen data on a display, generally, the screen data and the digital information data are mixed by using software in the PC, and the digital information data are displayed on several lines positioned upper and/or lower ends of a screen of the display. FIG. 1 is a diagram showing a region where digital information data are displayed on a screen of a display at a conventional information displaying system. As shown in FIG. 1, for example, when digital information data occupying 16 lines 32 are displayed on a screen whose resolution is 1024 dots×768 lines, a working region 31 for screen data becomes 1024 dots×752 lines. Therefore, there is a problem that the amount of information of the screen data, which are displayed on the working region 31, becomes small. That is, at the conventional information displaying system, when the digital information data are displayed on the display, the amount of the screen data, which are displayed on the working region, is decreased by the amount of the digital information data.

SUMMARY OF THE INVENTION

It is therefore an object of the present invention to provide an information displaying system, in which digital information data can be displayed without decreasing the amount of screen data to be displayed on a screen of a display.

According to a first aspect of the present invention, for achieving the object mentioned above, there is provided an information displaying system. The information displaying system provides an A/D converting means for converting analog RGB signals inputted from a first input terminal to first digital RGB signals, a selecting means for selecting either second digital RGB signals inputted from a second input terminal or the first digital RGB signals based on the inputted order, and for outputting third digital RGB signals being selected digital RGB signals, a screen mixing means that makes the third digital RGB signals store in a first memory and also makes digital information data inputted from a third input terminal store in a second memory, and detects sizes of the third digital RGB signals and the digital information data, and calculates designated control information so that the digital information data are displayed at outsides of a displaying region of the third digital RGB signals by mixing the digital information data with the third digital RGB signals, and generates a synchronization signal based on the designated control information, and reads the third digital RGB signals from the first memory and the digital information data from the second memory based on the synchronization signal, and forms displaying data by mixing the third digital RGB signals read from the first memory and the digital information data read from the second memory, and a displaying means for displaying the displaying data.

According to a second aspect of the present invention, in the first aspect, the designated control information consists of a dot clock frequency, a horizontal synchronizing frequency, a vertical synchronizing frequency, a front porch, a back porch, and a pulse width, in order that the displaying data are displayed on the displaying means.

According to a third aspect of the present invention, in the first aspect, the screen mixing means forms the displaying data so that the digital information data are displayed on at least one or two or more regions of upper, lower, right, and left end parts outside the displaying region of the third digital RGB signals.

According to a fourth aspect of the present invention, in the first aspect, the screen mixing means outputs the displaying data by applying scaling to the displaying data so that the displaying data correspond to the resolution of the displaying means.

According to a fifth aspect of the present invention, in the first aspect, the screen mixing means outputs the displaying data by converting the displaying data to analog RGB signals.

According to a sixth aspect of the present invention, in the first aspect, the information displaying system further provides an D/A converting means for converting the displaying data to analog RGB signals.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
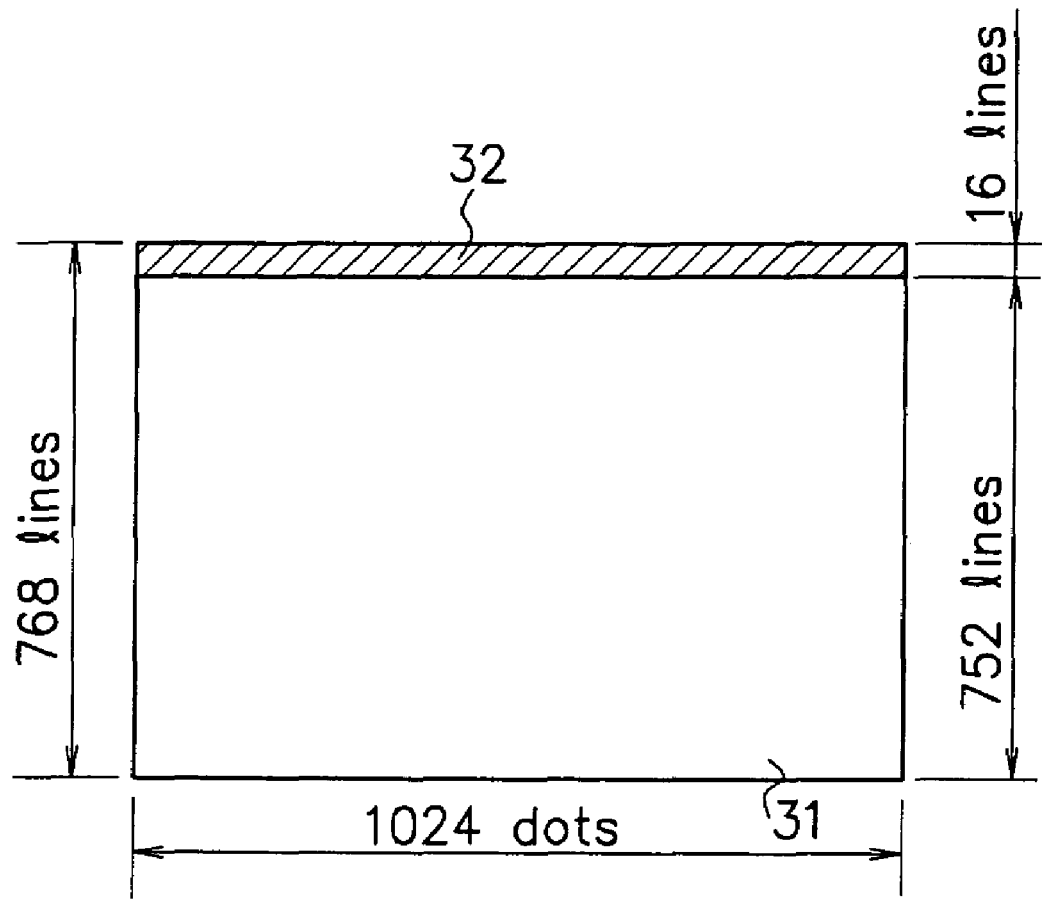
FIG. 1 is a diagram showing a region where digital information data are displayed on a screen of a display at a conventional information displaying system.
Figure 2:
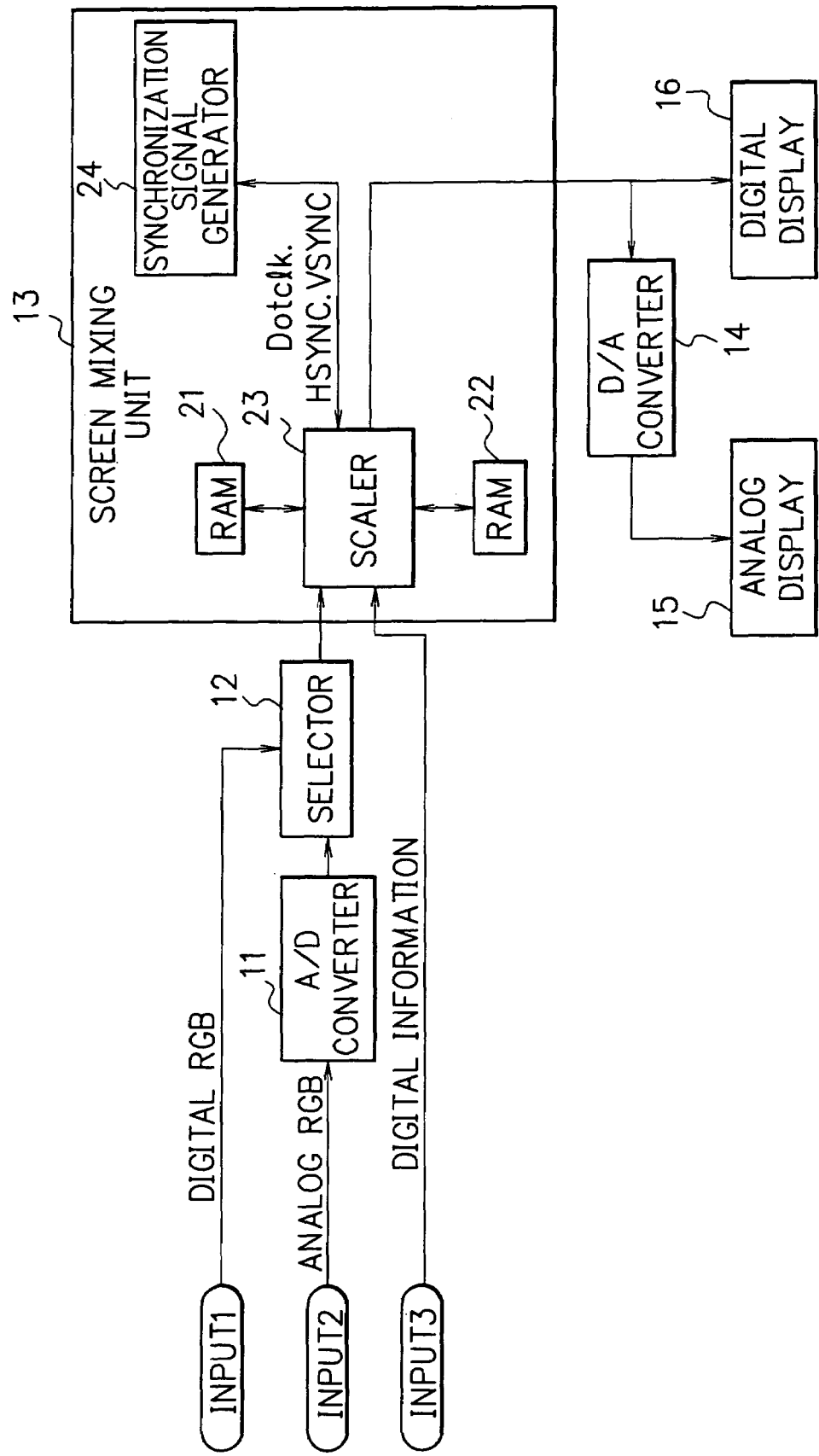
FIG. 2 is a block diagram showing a structure of a first embodiment of an information displaying system of the present invention.

Referring now to the drawings, embodiments of the present invention are explained in detail. FIG. 2 is a block diagram showing a structure of a first embodiment of an information displaying system of the present invention. As shown in FIG. 2, the first embodiment of the information displaying system of the present invention consists of an input 1, an input 2, an input 3, an A/D converter 11, a selector 12, a screen mixing unit 13, a D/A converter 14, an analog display 15, and a digital display 16. And the input 1 is an input terminal from which digital RGB signals from a PC are inputted, the input 2 is an input terminal from which analog RGB signals from the PC are inputted, and the input 3 is an input terminal from which digital information data such as news and a commercial message are inputted from the PC or other equipment. The A/D converter 11 converts the analog RGB signals inputted from the input 2 to digital RGB signals. The selector 12 selects either the digital RGB signals from the input 1 or the digital RGB signals from the A/D converter 11, and outputs the selected digital RGB signals (screen data). That is, the information displaying system of the present invention can correspond to both the analog and digital RGB signals and selects one of the analog and digital RGB signals, based on the inputted order to the information displaying system of the present invention.

Figure 3:
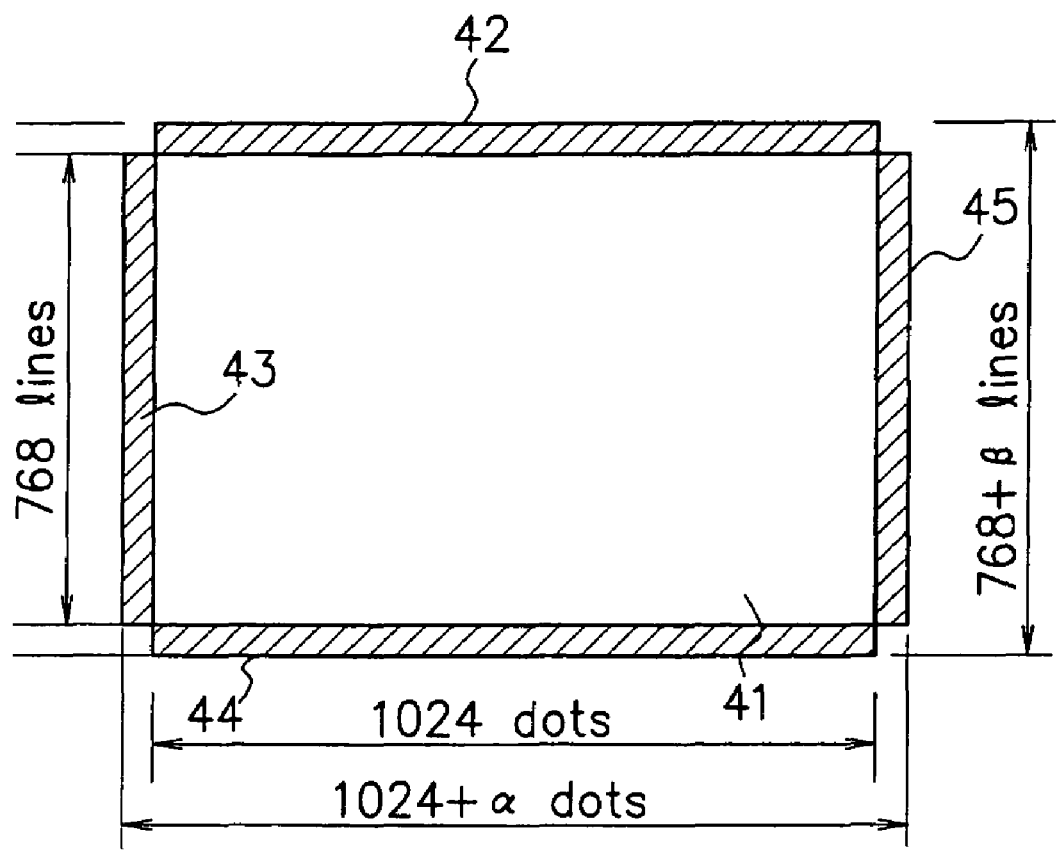
FIG. 3 is a diagram showing regions where digital information data and screen data are displayed on a screen of a display at the information displaying system of the present invention.

FIG. 3 is a diagram showing regions where digital information data and screen data are displayed on a screen of a display at the information displaying system of the present invention. The screen mixing unit 13 mixes the digital RGB signals (screen data) selected at the selector 12 with the digital information data so that the digital information data form the input 3 are displayed on regions outside a working region 41 where the digital RGB signals (screen data) are displayed. In this, as shown in FIG. 3, the regions where the digital information data are displayed are positioned at the upper and lower outside parts and the right and left outside parts of the working region 41. This screen shown in FIG. 3 is explained in detail later. The D/A converter 14 converts the digital RGB signals (mixed data) mixed at the screen mixing unit 13 to analog RGB signals. The analog display 15 being such as a CRT monitor displays the analog RGB signals outputted from the D/A converter 14. And the digital display 16 being such as an LCD monitor displays the digital RGB signal (mixed data) from the screen mixing unit 13 as digital data. The CRT monitor and the LCD monitor are well known, and these monitors are not directly related to the present invention, therefore the explanation about these monitors is omitted.

Referring to FIG. 2, the structure of the screen mixing unit 13 is explained in detail. The screen mixing unit 13 consists of a RAM 21, a RAM 22, a scaler 23, and a synchronization signal generator 24. The RAM 21 is a frame memory in which the digital RGB signals (screen data) outputted from the selector 12 are stored. The RAM 22 is a frame memory in which the digital information data inputted from the input 3 are stored. The scaler 23 processes the data from the RAMs 21 and 22. And the synchronization signal generator 24 generates a synchronization signal.

Next, referring to FIG. 2, the operation of the information displaying system of the present invention is explained. The operation of the A/D converter 11 and the selector 12 are well known and not directly related to the present invention, therefore these explanations are omitted. First, either digital RGB signals inputted from the input 1 or digital RGB signals that are converted at the A/D converter 11 from analog RGB signals inputted from the input 2 are selected at the selector 12 based on the inputted order, and the selected digital RGB signals (screen data) are outputted.

When the digital RGB signals (screen data) outputted from the selector 12 and digital information data inputted from the input 3 are inputted to the scaler 23, the scaler 23 makes the RAM 21 store the digital RGB signals (screen data) and also makes the RAM 22 store the digital information data. The scaler 23 detects the sizes of the digital RGB signals (screen data) and the digital information data, and calculates a dot clock frequency, a horizontal synchronizing frequency, a vertical synchronizing frequency, a front porch, a back porch, a pulse width, in order that both of the digital RGB signals (screen data) and the digital information data can be displayed on the analog display 15 or the digital display 16, and controls the synchronization signal generator 24 based on the calculated values.

The synchronization signal generator 24 generates a synchronization signal based on the information from the scaler 23. The scaler 23 reads data from the RAMs 21 and 22 based on the synchronization signal generated at the synchronization signal generator 24 and forms digital RGB signals (mixed data) that are displayed on the analog display 15 or the digital display 16. As shown in FIG. 3, the digital RGB signals (mixed data) formed at the scaler 23 are data whose digital RGB signals (screen data) are displayed at the working region 41 of the screen, and whose digital information data are displayed on digital information data adding regions 42, 43, 44, and 45 of the screen.

And at the case that the screen is the screen of the analog display 15 being such as a CRT monitor having an analog RGB input interface, the scaler 23 makes the D/A converter 14 convert the digital RGB signals (mixed data) to analog RGB signals and makes the D/A converter 14 output the converted analog RGB signals to the analog display 15. At the case of the CRT monitor having the analog RGB input interface, the working region 41 and the digital information data adding regions 42, 43, 44, and 45 of the screen are all displayed on the analog display 15. However, at the case that the display is the digital display 16 being such as an LCD monitor having a digital RGB input interface, the scaler 23 applies scaling to the digital RGB signals (mixed data), and after the scaling, makes the digital display 16 display the digital RGB signals (mixed data) to which the scaling was applied. In this, since the resolution of the LCD monitor is fixed, the scaler 23 applies the scaling to the digital RGB signals (mixed data) being $(1024+\alpha)$ dots×$(768+\beta)$ lines and converts to 1024 dots×768 lines being the resolution of the LCD monitor, and makes the digital display 16 display the converted digital RGB signals. Consequently, after the conversion, the resolution of the working region 41 becomes lower than the resolution of the digital RGB signals inputted from the input 1 or the resolution of the analog RGB signals inputted from the input 2, however, the amount of the information that is displayed in the working region 41 is not changed from the inputted amount of the information.

Figure 4:
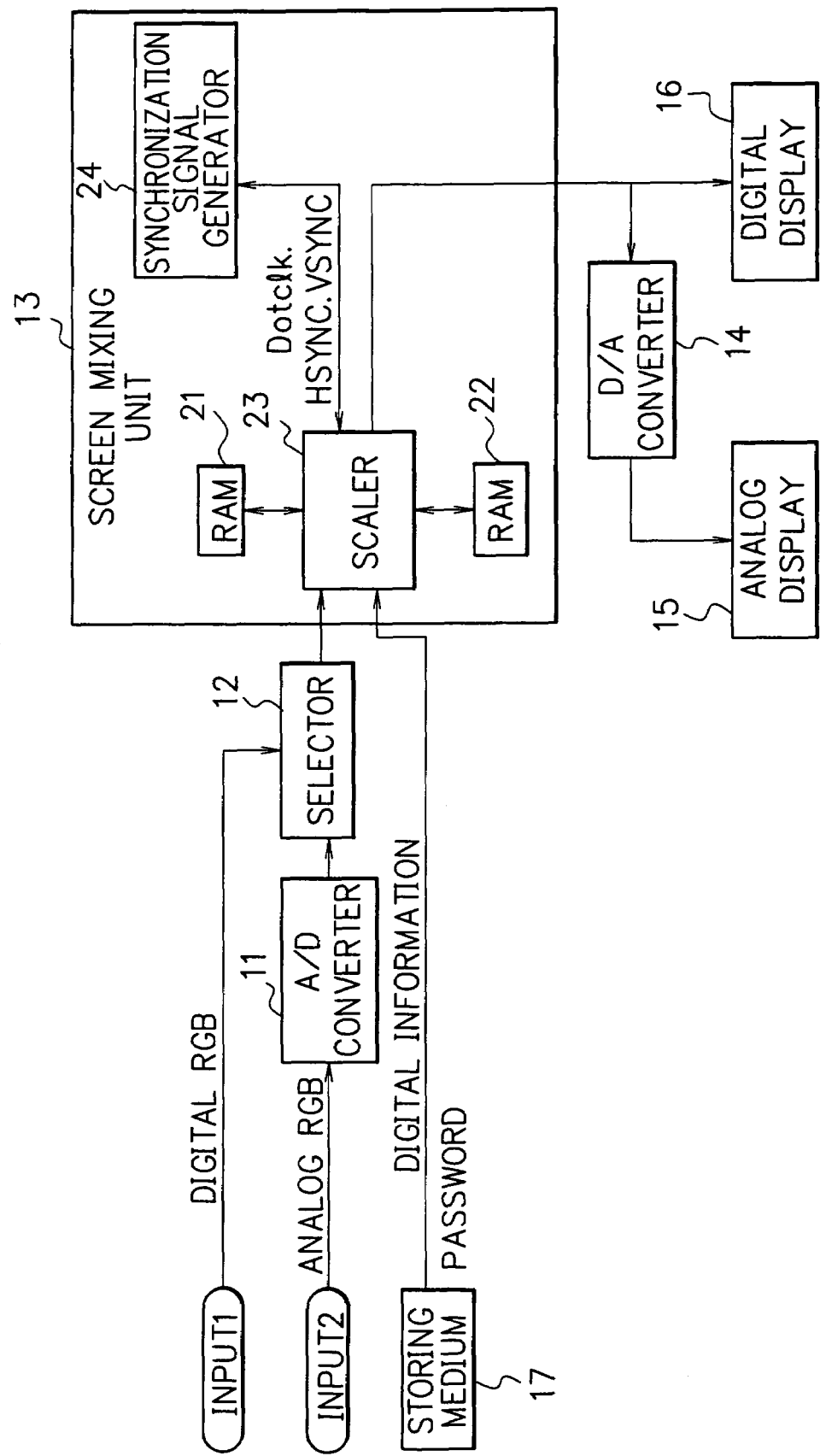
FIG. 4 is a block diagram showing a structure of a second embodiment of the information displaying system of the present invention.

FIG. 4 is a block diagram showing a structure of a second embodiment of the information displaying system of the present invention. Referring to FIG. 4, the second embodiment of the information displaying system of the present invention is explained. As shown in FIG. 4, the second embodiment of the information displaying system of the present invention has almost the same structure that the first embodiment has. And each function which has the same function at the first embodiment has the same reference number that the first embodiment has, and the same explanation is omitted. However, at the second embodiment, a storing medium 17 such as a PC card is provided instead of the input 3 at the first embodiment, that is, the digital data inputting section is different from the first embodiment. The digital information data which are inputted to the screen mixing unit 13 are recorded in the storing medium 17 such as the PC card. Password information is also recorded in the storing medium 17, and the scaler 23 reads the digital information data and also the password information. When the password information is wrong or information does not exist in the storing medium 17, the screen mixing unit 13 does not outputs the digital RGB signals (mixed data) to the digital display 16.

Therefore, at the second embodiment, for example, when personal computers are distributed free of charge, a commercial message recorded in the storing medium 17 can be certainly displayed on the screen with the screen data.

As mentioned above, according to the present invention, digital information data such as news and a commercial message are mixed at information data adding regions, positioned at outside of a working region of a display in which screen data from a personal computer are displayed, with the screen data by a screen mixing unit, without decreasing the screen data in the working region. And the mixed data are converted to mixed data having a synchronization frequency being able to displayed on the display, therefore, without decreasing the amount of information of the screen data that are displayed on the working region of the display, the digital information data can be displayed. Further, the image mixing that is conventionally executed in the personal computer is executed in the screen mixing unit in the information displaying system, therefore the load for the personal computer can be reduced.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An information displaying system, comprising:
   an A/D converting means for converting analog RGB signals inputted from a first input terminal to first digital RGB signals;
   a selecting means for selecting either second digital RGB signals inputted from a second input terminal or said first digital RGB signals based on the inputted order, and for outputting third digital RGB signals being selected digital RGB signals;
   a screen mixing means comprising:
      a first memory for storing said third digital RGB signals, and
      a second memory for storing digital information data inputted from a third input terminal,
      said screen mixing means
         detecting sizes of said third digital RGB signals and said digital information data,
         calculating designated control information,
         mixing said digital information data with said third digital RGB signals,
         generating a synchronization signal based on said designated control information,
         reading said third digital RGB signals from said first memory and said digital information data from said second memory based on said synchronization signal, and
         forming displaying data by mixing said third digital RGB signals read from said first memory and said digital information data read from said second memory,
   so that said digital information data are displayed without overlap at outsides of a displaying region of said third digital RGB signals in one or more regions at at least one of an upper, a lower, a right and a left side of said displaying region; and
      a displaying means for displaying said displaying data, the regions for displaying said digital information being at an edge of said displaying means.

2. An information displaying system in accordance with claim 1, wherein:
   said designated control information comprises a dot clock frequency, a horizontal synchronizing frequency, a vertical synchronizing frequency, a front porch, a back porch, and a pulse width, so that said displaying data are displayed on said displaying means.

3. An information displaying system in accordance with claim 1, wherein:
   said screen mixing means forms said displaying data comprising digital information data displayed on at least one region of at least one of upper, lower, right, and left end parts which are outside of said displaying region of said third digital RGB signals.

4. An information displaying system in accordance with claim 1, wherein:
   said screen mixing means outputs said displaying data by applying scaling to said displaying data so that said displaying data correspond to the resolution of said displaying means.

5. An information displaying system in accordance with claim 1, wherein:
   said screen mixing means outputs said displaying data by converting said displaying data to analog RGB signals.

6. An information displaying system in accordance with claim 1, further comprising a D/A converting means for converting said displaying data to analog RGB signals.

7. An information displaying system, comprising:
   an A/D converting means for converting analog RGB signals inputted from a first input terminal to first digital RGB signals;
   a selecting means for selecting either second digital RGB signals inputted from a second input terminal or said first digital RGB signals based on the inputted order, and for outputting third digital RGB signals being selected digital RGB signals;
   a screen mixing means comprising:
      a first memory for storing said third digital RGB signals, and
      a second memory for storing digital information data inputted from a third input terminal,
      said screen mixing means
         detecting sizes of said third digital RGB signals and said digital information data,
         calculating designated control information,
         mixing said digital information data with said third digital RGB signals,
         generating a synchronization signal based on said designated control information,
         reading said third digital RGB signals from said first memory and said digital information data from said second memory based on said synchronization signal, and
         forming displaying data by mixing said third digital RGB signals read from said first memory and said digital information data read from said second memory,
   so that said digital information data are displayed at outsides of a displaying region of said third digital RGB signals, without overlap; and
      a displaying means for displaying said displaying data, wherein said digital information is displayed around said displaying region of said third digital RGB signals.

8. An information displaying system, comprising:
   an A/D converting means for converting analog RGB signals inputted from a first input terminal to first digital RGB signals;
   a selecting means for selecting either second digital RGB signals inputted from a second input terminal or said first digital RGB signals based on the inputted order, and for outputting third digital RGB signals being selected digital RGB signals;

a screen mixing means comprising:
  a first memory for storing said third digital RGB signals, and
  a second memory for storing digital information data inputted from a third input terminal and for storing password information,
  said screen mixing means
    detecting sizes of said third digital RGB signals and said digital information data,
    calculating designated control information,
    mixing said digital information data with said third digital RGB signals,
    generating a synchronization signal based on said designated control information,
    reading said third digital RGB signals from said first memory and said digital information data from said second memory based on said synchronization signal, and
    forming displaying data by mixing said third digital RGB signals read from said first memory and said digital information data read from said second memory,
  so that said digital information data are displayed at outsides of a displaying region of said third digital RGB signals, without overlap; and
  a displaying means for displaying said displaying data,
    wherein said password information is read out from said second memory, and
    if said password information is incorrect, or if said password information does not exist, then said third digital RGB signals are not displayed.

* * * * *